United States Patent [19]
Kagawa et al.

[11] Patent Number: 5,252,385
[45] Date of Patent: Oct. 12, 1993

[54] ELASTOMER FILM AND COMPOSITE CONTAINING SAME

[75] Inventors: Seiji Kagawa; Hideaki Toda, both of Yokohama; Yoshihiro Uotome, Kaizuka, all of Japan

[73] Assignee: Tonen Sekiyukagaku Kabushiki Kaisha, Tokyo, Japan

[21] Appl. No.: 983,278

[22] Filed: Nov. 30, 1992

Related U.S. Application Data

[63] Continuation of Ser. No. 552,647, Jul. 16, 1990, abandoned.

[30] Foreign Application Priority Data

Jul. 17, 1989 [JP] Japan .................................. 1-183997
Jul. 17, 1989 [JP] Japan .................................. 1-183998

[51] Int. Cl.⁵ ...................... B32B 27/32; C08L 45/00; C08L 33/04
[52] U.S. Cl. .................................. 428/220; 428/286; 428/248; 428/247; 428/255; 428/264; 428/910; 428/265; 525/211; 525/222
[58] Field of Search ................ 525/211, 222; 428/220, 428/337, 338, 339, 521, 522, 910

[56] References Cited

U.S. PATENT DOCUMENTS

| 4,714,735 | 12/1987 | Hodgson, Jr. et al. | 525/222 |
| 4,877,827 | 10/1989 | Van Der Groep | 525/222 |
| 4,945,127 | 7/1990 | Kagawa et al. | 525/222 |
| 4,997,880 | 3/1991 | Van Der Groep | 525/222 |
| 5,001,195 | 3/1991 | van Groep | 525/222 |

FOREIGN PATENT DOCUMENTS 0172645 2/1986 European Pat. Off. .
0276128 7/1988 European Pat. Off. .
0323742 7/1989 European Pat. Off. .

*Primary Examiner*—George F. Lesmes
*Assistant Examiner*—Kathryne Elaine Shelborne
*Attorney, Agent, or Firm*—Armstrong, Westerman, Hattori, McLeland & Naughton

[57] ABSTRACT

An elastomer film of a thermoplastic elastomer composition comprising 30-70 weight % of an ethylene-propylene-diene copolymer and 70-30 weight % of an ethylene-vinyl acetate copolymer having a vinyl acetate content of 5-30 weight % and a melt index of 0.2-25 g/10 minutes, the elastomer film having a thickness of 10-60 μm, and a draw ratio expressed by a heat shrinkage ratio at 50° C. which is 5-35% in an MD direction and 5-25% in a TD direction, the ratio of the draw ratio in an MD direction to the draw ratio in a TD direction being 3 or less, is produced by an air-cooled inflation method.

6 Claims, 4 Drawing Sheets

— 5,252,385 —

ELASTOMER FILM AND COMPOSITE CONTAINING SAME

This application is a continuation of application Ser. No. 07/552,647 filed Jul. 16, 1990, now abandoned.

BACKGROUND OF THE INVENTION

The present invention relates to an elastomer film produced from a thermoplastic elastomer composition by an air-cooled inflation method which is sufficiently oriented not only in an MD direction but also in a TD direction, thereby showing a small anisotropy, a method and an apparatus for producing such an elastomer film, and a microporous composite film comprising such an elastomer film.

Films made of thermoplastic elastomer compositions consisting of elastomers and thermoplastic resins have elasticity and shrinkability which are not possessed by thermoplastic resin films, so that they are expected to be used in many applications.

Films of such thermoplastic elastomer compositions containing ethylene-vinyl acetate copolymer (EVA) components are partly produced by an inflation method, but most of them are produced by a casting method. However, in the production of films by a casting method, drawing in an MD direction (longitudinal direction of a machine) is relatively easy, but drawing in a TD direction (transverse direction) is difficult, making it difficult to produce biaxially oriented films. In addition, to prevent the blocking of films, a parting sheet should be inserted into adjacent film layers in winding, posing economic disadvantages.

On the other hand, in the production of films by an inflation method, the above problems can be avoided, but since the thermoplastic elastomer composition shows a low melt tension in the production process of the films, it is difficult to keep bubbles of the thermoplastic elastomer compositions stably. Particularly, in the case of producing thin films (60 $\mu$m or less, particularly 40 $\mu$m or less), uniform films cannot be obtained because the bubbles are not kept stable.

OBJECT AND SUMMARY OF THE INVENTION

In view of the above problems, an object of the present invention is to provide a thin, uniform elastomer film made of an ethylene-propylene-diene copolymer-/an ethylene-vinyl acetate copolymer by an air-cooled inflation method.

Another object of the present invention is to provide an air-cooled inflation method for producing such an elastomer film from a thermoplastic elastomer composition.

A further object of the present invention is to provide an apparatus for producing such an elastomer film from a thermoplastic elastomer composition by an air-cooled inflation method.

A still further object of the present invention is to provide a microporous composite film comprising such an elastomer film and a mesh-like sheet combined together under heated conditions.

As a result of intense research in view of the above problems, the inventors have found that in the production of a biaxially oriented elastomer film from a thermoplastic elastomer composition comprising an ethylene-propylene-diene copolymer and an ethylene-vinyl acetate copolymer in a particular proportion by an air-cooled inflation method, sufficient drawing not only in an MD direction but also in a TD direction can be achieved by controlling temperatures of various portions of a bubble of the thermoplastic elastomer composition while keeping the bubble stably, whereby a thin, uniform elastomer film can be obtained. The present invention is based upon this finding.

Thus, the first elastomer film according to the present invention is produced from a thermoplastic elastomer composition comprising 30-70 weight % of an ethylene-propylene-diene copolymer and 70-30 weight % of an ethylene-vinyl acetate copolymer having a vinyl acetate content of 5-30 weight % and a melt index of 0.2-25 g/10 minutes by an air-cooled inflation method, the elastomer film having a thickness of 10-60 $\mu$m, and a draw ratio expressed by a heat shrinkage ratio at 50° C. which is 5-35% in an MD direction and 5-25% in a TD direction, a ratio of the draw ratio in an MD direction to the draw ratio in a TD direction being 3 or less.

The second elastomer film according to the present invention is produced from a thermoplastic elastomer composition comprising 30-70 weight % of an ethylene-propylene-diene copolymer and 70-30 weight % of an ethylene-vinyl acetate copolymer having a vinyl acetate content of 5-30 weight % and a melt index of 0.2-25 g/10 minutes by an air-cooled inflation method and then by annealing, the elastomer film having a thickness of 10-60 $\mu$m, and a draw ratio expressed by a heat shrinkage ratio at 50° C. which is 10-2% in an MD direction and 10-2% in a TD direction, a ratio of the draw ratio in an MD direction to the draw ratio in a TD direction being 3 or less.

The method of producing an elastomer film from a thermoplastic elastomer composition by an air-cooled inflation method according to the present invention comprises the steps of:

(a) extruding the thermoplastic elastomer composition from an annular die at a temperature of 170° C. or lower;

(b) taking up a bubble of the elastomer film such that a neck portion of the bubble is 1.0-4.0 times as long as a diameter of the annular die;

(c) cooling the neck portion to a temperature of 120° C. or lower by a cooling air ejected from a first cooling ring disposed near the annular die;

(d) drawing the bubble both in an MD direction and in a TD direction in a bubble transition portion between the neck portion and a frost line, while lowering the temperature of the bubble in the frost line to 45° C. or lower;

(e) cooling the bubble to a temperature of 35° C. or lower by a cooling air ejected from a second cooling ring disposed above the frost line; and (f) cooling the bubble to a temperature of 30° C. or lower by a cooling air ejected from a third cooling ring disposed slightly above the second cooling ring, whereby the bubble is not subsequently drawn.

The apparatus for producing an elastomer film from a thermoplastic elastomer composition by an air-cooled inflation method according to the present invention comprises:

(a) an annular die for extruding the thermoplastic elastomer composition at a temperature of 170° C. or lower;

(b) a first cooling ring disposed near the annular die for cooling a neck portion of a bubble formed from the thermoplastic elastomer composition to a temperature of 120° C. or lower;

(c) a second cooling ring disposed above a frost line of the bubble for cooling the bubble to a temperature of 35° C. or lower;

(d) a third cooling ring disposed slightly above the second cooling ring for cooling the bubble to a temperature of 30° C. or lower; and (e) a means for taking up the bubble at such a take-up speed that the neck portion is 1.0–4.0 times as long as a diameter of the annular die.

The composite film according to the present invention is constituted by the above first or second elastomer film and a mesh-like sheet, the elastomer film being hot-pressed to the mesh-like sheet at a temperature of 60° C. or higher, so that the elastomer film is fixed to the mesh-like sheet while being heat-shrinked, whereby the elastomer film is made microporous.

DETAILED DESCRIPTION OF THE INVENTION

Figure 1:
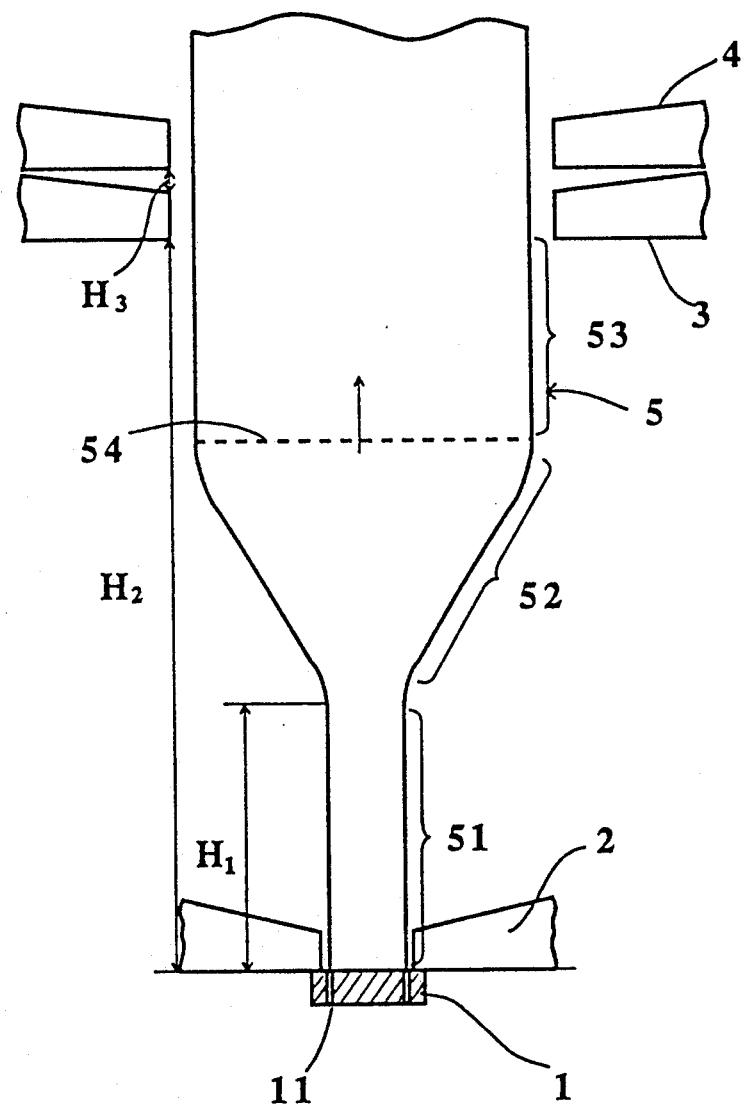
FIG. 1 is a schematic view showing the air-cooled inflation method for producing the elastomer film of the present invention.

In the method of the present invention, the thermoplastic elastomer compositions which may be used for elastomer films include compositions comprising ethylene-α-olefin copolymer rubbers and ethylene vinyl acetate copolymers.

The ethylene-α-olefin copolymer rubbers mean rubbers made of ethylene and α-olefins such as propylene, butene-1, hexene-1, octene-1, etc., and their typical examples are ethylene-propylene copolymer rubbers (EPR) and ethylene-propylene-diene copolymers (EPDM). EPDM used in the present invention means a copolymer containing a repeating unit derived from ethylene, a repeating unit derived from propylene and a repeating unit derived from a diene compound. The diene compounds include ethylidene-norbornene, 1,4-hexadiene, dicyclopentadiene, etc.

The ethylene-propylene-diene copolymer (EPDM) used in the present invention is preferably composed of 60–70 mol % of the repeating unit derived from ethylene, 30–40 mol % of the repeating unit derived from propylene and 1–10 mol % of the repeating unit derived from the diene compound. More preferably, the ethylene repeating unit is 62–66 mol %, the propylene repeating unit is 33–37 mol %, and the diene compound repeating unit is 3–6 mol %.

The number-average molecular weight of the ethylene-propylene-diene copolymer is preferably 400,000–600,000, and its density is preferably 0.87 g/cm³ or less. Further, its melt index (190° C., 2.16 kg load) is preferably in the range of 0.1–5.0 g/10 minutes, and more preferably 0.30–1.0 g/10 minutes.

The ethylene-propylene-diene copolymer (EPDM) used in the present invention consists essentially of the above repeating units, but it may further contain additional repeating units derived from α-olefins such as butene-1, 4-methyl-pentene-1, etc., within such a range as not to deteriorate the properties of the copolymer.

The ethylene-vinyl acetate copolymer (EVA) used in the present invention means a copolymer having 5–30 weight % of a vinyl acetate repeating unit, and a melt index (190° C., 2.16 kg load) within the range of 0.2–25 g/10 minutes. When the vinyl acetate content is less than 5 weight %, the resulting thermoplastic elastomer composition shows poor rubber elasticity. On the other hand, when it exceeds 30 weight %, the resulting films suffer from blocking, making its film production difficult. The preferred vinyl acetate content is 15–30 weight %. With respect to the melt index, when it is less than 0.2 g/10 minutes, the composition cannot easily be formed into films, and when it exceeds 25 g/10 minutes, the film production by an air-cooled inflation method is difficult. The preferred melt index of the ethylene-vinyl acetate copolymer is 15–25 g/10 minutes.

The proportion of the ethylene-propylene-diene copolymer (EPDM) in the thermoplastic elastomer composition according to the present invention is 30–70 weight % based on the resin components (100 weight %), and it is preferably 50–60 weight %. When the proportion of the ethylene-propylene-diene copolymer (EPDM) is lower than 30 weight %, the resulting elastomer film shows poor elongation, and a composite film formed therefrom by heat shrinkage cannot have sufficient microporosity. On the other hand, when it exceeds 70 weight %, the resulting elastomer film shows decreased formability.

The content of the ethylene-vinyl acetate copolymer (EVA) is 70–30 weight % based on the resin components (100 weight %), and it is preferably 50–40 weight %. The reason for limiting the content of the ethylene-vinyl acetate copolymer is just opposite to that for limiting the ethylene-propylene-diene copolymer content. That is, when the content of the ethylene-vinyl acetate copolymer is lower than 30 weight %, the resulting film shows poor formability, and when it exceeds 70 weight %, the elastomer film shows poor elongation.

The thermoplastic elastomer composition according to the present invention can be improved with respect to its anti-blocking property and formability by adding polyolefin. The polyolefins added to the thermoplastic elastomer composition include homopolymers of α-olefins such as ethylene, propylene, butene-1, pentene-1, hexene-1, 4-methylpentene1, etc., copolymers of ethylene with propylene or other α-olefins, and copolymers of two or more of these α-olefins. Among them, low-density polyethylene, linear low-density polyethylene, medium-density. polyethylene, high-density polyethylene, etc. are preferable. The above polyethylene preferably has a density of 0.945 g/cm³ or less, and a melt index of 0.1–10 g/10 minutes. Incidentally, the term "polypropylene" used herein includes not only homopolymer of propylene but also random or block propylene copolymers.

The amount of the polyolefin added is preferably 1–30 parts by weight per 100 parts by weight of EPDM+EVA, and particularly 5–20 parts by weight. Incidentally, the amount of the polyolefin is preferably determined such that the resulting composition containing the polyolefin has a melt index of 0.5–20 g/10 minutes. When the amount of the polyolefin is lower than 1 part by weight, sufficient improvement of anti-blocking property and formability cannot be obtained, and when it exceeds 30 parts by weight, the resulting composition shows poor elasticity.

The addition of powdery inorganic fillers serves to improve anti-blocking property and heat resistance of the thermoplastic elastomer composition of the present invention, and also to make it easier to achieve microporosity of the resulting composite film. Examples of the inorganic fillers usable in the present invention include talc, calcium carbonate, gypsum, carbon black, clay, kaolin, silica, diatomaceous earth, magnesium carbonate, barium carbonate, magnesium sulfate, barium sulfate, calcium sulfate, calcium phosphate, aluminium hydroxide, zinc oxide, magnesium hydroxide, calcium oxide, magnesium oxide, titanium oxide, alumina, mica, vitreous volcanic baloons, zeolite, silica clay, cement, silica fume and micaeous flour. Among the above fillers, talc, titanium oxide, calcium carbonate, silica, etc. are proved to be particularly desirable. The average particle diameter of such fillers is required not to exceed 5 μm, and is desired to fall in the range of 1-3 μm.

These powdery inorganic fillers can be used alone or in combination. The amount of the powdery inorganic fillers in total is preferably 2-15 parts by weight per 100 parts by weight of EPDM+EVA. When it is lower than 2 parts by weight, sufficient effects of adding powdery inorganic fillers cannot be obtained, and when it exceeds 15 parts by weight, the resulting composition shows rather decreased strength. However, since the compositions containing the above inorganic fillers show decreased film-forming properties and drawability, the amount of the inorganic fillers should be determined within the above range depending upon an application of the elastomer film.

Incidentally, in the present invention, the composition may contain, in addition to the above additives, a thermostabilizer, an ultraviolet absorbing agent, an antistatic agent, an anti-oxidant, a colorant, etc. in proper combination.

The elastomer film of the present invention can be produced from the thermoplastic elastomer composition by the following method.

The blending of the above ethylene-propylene-diene copolymer (EPDM), the ethylene-vinyl acetate copolymer (EVA) and optional additives should be conducted at a temperature of 170° C. or lower. Particularly in the present invention, the blending temperature at 145°-165° C. is preferable. When the blending temperature is higher than 170° C., the resin tends to be thermally deteriorated, generating unpleasant odor and tackiness. Accordingly, when the blending is conducted in an extruder such as a double-screw extruder, the extruder should have a screw structure generating little heat, or it should be provided with a proper cooling system. With respect to the lower limit of a blending temperature, when it is lower than 145° C., an extrusion rate is undesirably unstable.

It is also necessary that the resin immediately after extruded from an inflation annular die is at a temperature of 170° C. or lower. When a bubble immediately after extruded from an annular die is at a temperature exceeding 170° C., the bubble cannot be cooled to 45° C. or lower by a first cooling ring. Particularly, the bubble immediately after extruded from the annular die is preferably at a temperature of 145°-165° C.

The bubble extruded from the annular die is expanded not only in an MD direction but also in a TD direction while being cooled by an air-cooled inflation method. This is schematically shown in FIG. 1.

In FIG. 1, the air-cooled inflation method apparatus comprises an annular die 1, a first cooling ring 2 disposed just above the annular die 1, a second cooling ring 3 disposed above the annular die 1 and a third cooling ring 4 disposed slightly above the first cooling ring 2.

To produce the elastomer film of the present invention by an air-cooled inflation method by using the apparatus of the above structure, a molten thermoplastic elastomer composition is first extruded through an annular orifice 11 of the annular die 1 to form a bubble 5. The bubble 5 just after extrusion has a small diameter because of a low melt tension, forming a so-called neck portion 51. In the neck portion 51, the bubble 5 is drawn mainly in an MD direction. Next, the bubble 5 is drastically expanded to a larger diameter. In this transition portion 52, the bubble 5 is drawn not only in an MD direction but also in a TD direction. The bubble 5 has a frost line 54 near an upper end of the transition portion 52, where the thermoplastic elastomer composition is solidified. The bubble 5 is further cooled by the second cooling ring 3 disposed above the frost line 54 and further by the third cooling ring 4 disposed above the second cooling ring 3.

The air-cooled inflation method for producing the elastomer film of the present invention is characterized by controlling temperatures of various portions of the bubble 5 as follows:

(a) Temperature immediately after extrusion from the annular die 1 is 170° C. or lower.

(b) In the neck portion 51, the bubble 5 is cooled to 120° C. or lower.

(c) Near the frost line 54, the bubble 5 is cooled to 45° C. or lower.

(d) The bubble 5 is cooled to 35° C. or lower by the second cooling ring 3.

(e) The bubble 5 is further cooled to 30° C. or lower by the third cooling ring 4.

With respect to the condition (a), the reason therefor is already mentioned above. With respect to the condition (b), unless the bubble 5 is cooled to 120° C. or lower in the neck portion 51, it cannot be fully drawn in a TD direction in the subsequent transition portion 52. Namely, unless the neck portion 51 is cooled to 120° C. or lower, the transition portion 52 does not have a sufficient melt tension, resulting in orientation predominantly in an MD direction. On the other hand, the neck portion 51 is too cooled, it would be difficult to form the transition portion 52, namely to draw the bubble 5 in the TD direction. Accordingly, the lower limit of the bubble temperature in the neck portion 51 should be about 90° C. The neck portion 51 is preferably cooled to 90°-110° C.

Incidentally, to satisfy these temperature conditions, the neck portion 51 should be relatively long. The length of the neck portion 51 varies depending upon the diameter, thickness and temperature of the bubble 5, the flow amount of a cooling air from the first cooling ring 2, etc., but to satisfy the above condition (b), a take-up speed of the bubble 5 should be such that the neck portion 51 has a diameter equal to or smaller than the annular die diameter by 5-15%, and a length 1.0-4.0 times as large as the annular die diameter. For instance, when the neck portion 51 has a diameter of about 100 mm, the neck portion 51 preferably has a length of 100-400 mm.

With respect to a blow-up ratio, it is preferably 1.5–5.5, particularly 3.0–5.0.

With respect to the condition (c), cold drawing of the bubble 5 can be achieved by lowering the bubble temperature in the frost line 54 to 45° C. or lower. When the thermoplastic elastomer composition is drawn at a temperature of about 35°–50° C., particular near 40° C., the ethylene-propylene-diene copolymer component is partly oriented and crystallized. Accordingly, when the bubble temperature in the frost line 54 is higher than 45° C., the orientation of the bubble 5 both in an MD direction and a TD direction is insufficient.

With respect to the condition (d), a thin, uniform bubble can be stably formed by cooling the bubble 5 to 35° C. or lower, particularly to 30° C. or lower above the frost line 54. If the bubble 5 is kept at a temperature higher than 35° C. above the frost line 54 without using the second cooling ring 3, uneven orientation is likely to take place. Further, when the bubble 5 is kept at a temperature higher than 30° C. without using the third cooling ring 4, the bubble 5 tends to be expanded and deformed, making the overall bubble unstable. Thus, it is important that there is substantially no orientation in a relatively upper portion of the bubble 5. The preferred cooling temperature of the bubble 5 by the second cooling ring 3 is 25°–30° C.

With respect to the condition (e), since uneven cooling is likely to take place when the bubble 5 is cooled completely by the second cooling ring 3, it is necessary to cool the bubble 5 further by the third cooling ring 4. The cooling of the bubble 5 by the third cooling ring 4 is preferably to 30° C. or lower, particular to 20°–25° C.

By these second and third cooling rings 3, 4, the bubble 5 located above these cooling rings is not substantially drawn.

To conduct the temperature control of the bubble 5 as mentioned above, the positions of the first, second and third cooling rings 2, 3, 4, and the take-up speed of the bubble 5 should be as follows:

(a) First Cooling Ring 2

It is disposed adjacent to the annular die 1 to eject a cooling air to lower the temperature of the neck portion 51 to 120° C. or lower. By this, the bubble 5 is at a temperature of 45° C. or lower in the frost line 54 downstream of a transition portion 52.

(b) Second Cooling Ring 3

It is disposed above the annular die 1 by a distance $H_2$ 5–10 times as larger as a diameter of the annular die 1, and ejects a cooling air to lower the temperature of the bubble 5 to 35° C. or lower.

(c) Third Cooling Ring 4

It is disposed slightly above the second cooling ring 3 by a distance $H_3$ 0.5–5.0 times as large as a diameter of the annular die 1, and ejects a cooling air to lower the temperature of the bubble 5 to 30° C. or lower.

(d) Take-Up Speed

It is set such that the length $H_1$ of the neck portion 51 is 1.0–4.0 times as long as a diameter of the annular die 1. By this, it is possible to lower the temperature of the neck portion 51 to 120° C. or lower by the first cooling ring 2.

In the above method, as a cooling air ejected from the first, second and third cooling rings 2, 3, 4 toward the bubble 5, a humid air is preferable from the standpoint of cooling efficiency. The humid air is an air moistured and cooled by cold water, which contains a moisture in a saturated state. Thus, it provides a cooling effect larger than by about 5° C. than a dry air. Since the bubble 5 cannot be kept stably without stable cooling effect, the temperature and moisture of the cooling air should be controlled as constant as possible.

The resulting elastomer film can be subjected to annealing to suppress or reduce heat shrinkage, thereby preventing blocking.

This annealing can be conducted by heating the elastomer film at 50°–60° C. and then cooling it to room temperature. Since the elastomer film is usually produced as a continuous film, the annealing is preferably conducted continuously. Since the elastomer film is heat-shrinked in the annealing process, the take-up speed of the elastomer film discharged from a heating chamber is set by about 3% slower than the supply speed of the elastomer film.

The elastomer film thus obtained is fully oriented not only in an MD direction but also in a TD direction, so that it shows excellent mechanical strength and extremely small anisotropy in heat shrinkage.

Specifically, in the elastomer film of the present invention which is subjected to annealing, the draw ratio expressed by a heat shrinkage ratio at 50° C. is 5–35%, preferably 15–25% in an MD direction, and 5–25%, preferably 10–25% in a TD direction, a ratio of the draw ratio in an MD direction to the draw ratio in a TD direction being 3 or less, preferably ½–2. In addition, the elastomer film before annealing has an unevenness in thickness R (maximum thickness-minimum thickness of film) of 5 μm or less, and a strain within 10% after repeated 50%-elongation. Thus, the elastomer film before annealing has a sufficiently large heat shrinkage ratio both in an MD direction and in a TD direction and an extremely small anisotropy, so that it can be formed into an excellent microporous film when combined with a mesh-like sheet while heating.

With respect to the elastomer film of the present invention which is subjected to annealing, it has a draw ratio ratio expressed by a heat shrinkage ratio at 50° C. which is 10–2%, preferably 7–2% in an MD direction, and 10–2%, preferably 7–2% in a TD direction, a ratio of the draw ratio in an MD direction to the draw ratio in a TD direction being 3 or less, preferably ½–2. In addition, it has an unevenness in thickness R (maximum thickness–minimum thickness of film) of 5 μm or less, and a strain within 10% after repeated 50%-elongation.

Such an elastomer film of the present invention subjected to annealing has a smaller heat shrinkage ratio than the unannealed elastomer film, but the annealed elastomer film also shows extremely small anisotropy. Accordingly, when combined with a mesh-like sheet while heating, it can provide a good microporous film.

Here, in the case of EPDM/EVA=60/40 (weight ratio), an example of film-forming conditions in the production of an elastomer film by the air-cooled inflation method according to the present invention will be shown in Table 1 below in comparison with typical film-forming conditions of a water-cooled inflation method.

TABLE 1

| Film-Forming Conditions | Air-Cooled Inflation Method | Water-Cooled Inflation Method |
|---|---|---|
| Cylinder Temperature | 140–155 | 165–175 |

TABLE 1-continued

| Film-Forming Conditions | Air-Cooled Inflation Method | Water-Cooled Inflation Method |
| --- | --- | --- |
| of Extruder (°C.) | | |
| Resin Temperature at Die Exit (°C.) | 150–165 | 170–180 |
| Resin Pressure at Die Exit (kg/cm$^2$) | 250–320 | 160–180 |
| Extrusion Rate (kg/hour) | 24.0–28.0 | 27.0 |
| Take-Up Rate (m/minute) | 15.0–35.0 | 4.5–6.0 |
| Film Thickness (μm) | 10–60 | 60–200 |

In such an air-cooled inflation method for producing the elastomer film of the present invention, both the melt-blending temperature in an extruder and the temperature at an annular die exit are kept at 170° C. or lower, and inflation is conducted at a large take-up speed to provide a thin film.

And in the case of an air-cooled inflation method for producing the elastomer film of the present invention, influence of the resin temperature at the annular die exit on the melt tension and film-forming properties of the bubble will be shown in Table 2 below in an example of EPDM/EVA=60/40 (weight ratio).

TABLE 2

| Resin Temperature at Die Exit (°C.) | Melt Tension (g) | Film-Forming |
| --- | --- | --- |
| 120–140 | 12–10 | No (Film was unstable and contained gels) |
| 145–165 | 9.5–8.5 | Good (Both neck portion and bubble were stable) |
| 175–200 | 6.5–5.0 | No (Cells were generated) |

Thus, in the air-cooled inflation method, unless the resin temperature at an annular die exit is 170° C. or lower, sufficient melt tension cannot be achieved, failing to form a stable bubble. On the other hand, when it is 140° C. or lower, the bubble has an excess melt tension, rather making the bubble unstable.

Next, the production of a composite film by using the above elastomer film will be explained below.

The elastomer film produced by an air-cooled inflation method itself is not microporous, so that it has substantially no gas permeability. This elastomer film is combined with a mesh-like sheet.

The mesh-like sheet usable in the present invention may be any sheet having sufficiently large pores as a support for gas-permeable films, and also sufficient mechanical strength. Its examples include woven fabrics, non-woven fabrics, knits, papers, porous sheets, etc. The preferred mesh-like sheets are non-woven fabrics such as spun bonded non-woven fabrics, plain width fabrics such as gauzes, etc. The non-woven fabrics need not be made of long, staple fibers but may be made of short fibers interwined or spot-fused with each other.

It is required that the mesh-like sheet is not heat-shrinked or melted in the hot pressing process. Accordingly, the mesh-like sheet should have a melting point or a secondary transition point at least 20° C. higher than that of the elastomer film.

The hot pressing of the elastomer film to the mesh-like sheet is generally carried out at a temperature of 80°–150° C. on the mesh-like sheet side, and at a temperature of 75°–95° C. on the elastomer film side at a pressure of 1.0–10 kg/cm$^2$. Though the temperature and pressure ranges are more or less variable with the composition of the elastomer film and type of mesh-like sheet, too low temperature and pressure cannot act to adhere the elastomer film to the mesh-like sheet sufficiently, and too high temperature and pressure lead to the decrease in waterproofness of the resulting composite film. The particularly preferred hot pressing conditions are temperatures of 110°–130° C. on the mesh-like sheet side, and 85°–95° C. on the elastomer film side, and pressure of 5–10 kg/cm$^2$.

To produce the composite film, an elastomer film with or without annealing may be used. Since the elastomer film is heat-shrinked in the hot pressing with the mesh-like sheet at a temperature as mentioned above, the same effect as obtained by annealing can be obtained.

The hot pressing of the elastomer film to the mesh-like sheet is preferably carried out by using a heat roll. In the hot pressing, various arrangements of the elastomer film and the mesh-like sheet are possible. Specifically, one elastomer film can be adhered to one mesh-like sheet, and one elastomer film can be sandwiched by two mesh-like sheets. Alternatively, the mesh-like sheet can be sandwiched by two elastomer films.

In the present invention, after hot pressing of the elastomer film to the mesh-like sheet, heating and cooling process may be repeated. In this case, from a first heating-cooling step to a subsequent one, a heating temperature is preferably elevated stepwise, because if the hot-pressed film is heated straight to a high temperature by a single step, it becomes at least partially fluid-like, namely it is at least partially melted, losing its micropores. In the first heating-cooling step, the heating temperature should be lower than the melting temperature of the film. Thus, it is usually 70°–90° C. The heating time is not particularly limited, but if it is too long, the micropores tend to disappear. Accordingly, the heating time is preferably within 60 sec. By this heat treatment, unstable active groups in the resins are stabilized by cross-linking, thereby increasing the heat resistance of the film and also preventing the generation of unacceptable odor.

After heating, the film is preferably cooled to a temperature of 30° C. or lower. The function of this cooling step is not necessarily clear, but when the subsequent heating step is conducted without cooling, the film tends to lose micropores. Accordingly, the cooling step is indispensable after each heating step.

The heating temperature is elevated stepwise in the subsequent heating-cooling step, and the increment of the heating temperature is generally 50° C. or less. If the heating temperature is elevated by more than 50° C. by a single step, the film is likely to be melted because of insufficient degree of cross-linking. On the other hand, when the increase of the temperature is too small, the overall heat treatment becomes uneconomical. Therefore, the temperature increment from one step to a subsequent one is preferably 20°–40° C. for practical reasons. With this temperature increment, the heating-cooling steps are repeated successively.

The number of the heating-cooling steps and the heating temperature in each step may vary depending upon the composition of the elastomer film, the type of the mesh-like sheet, but when a fabric made of synthetic fibers such as polyester fibers, nylon fibers, etc. is used, it is preferable to conduct 3 steps of heating and cooling: A first step at 80° C., and a second step at 100° C. and a third step at 120° C., each for 60 sec or less, and cooling to 30° C. or less in each step. In the case of using a fabric made of natural fibers such as cotton fibers, it is preferable to conduct 4 steps: A first step at 80° C., a second step at 120° C., a third step at 160° C., a fourth step at 200° C., each for 60 sec or less, and cooling to 30° C. or less in each step.

In addition, in the present invention, after at least one heating-cooling step, electron beam irradiation can be conducted. By this electron beam irradiation, the ethylene-propylene-diene copolymer and the ethylene-vinyl acetate copolymer in the film are further cross-linked, leading to the improvement of the heat resistance of the composite film and the prevention of the generation of odor. In this case, the amount of electron beam irradiated is preferably 5-20 Mrad.

In the present invention, cross-linking agents are not used to accelerate the above cross-linking reaction, but the film has as high a gel percentage as 65-95 weight % after cross-linking.

Figure 2:
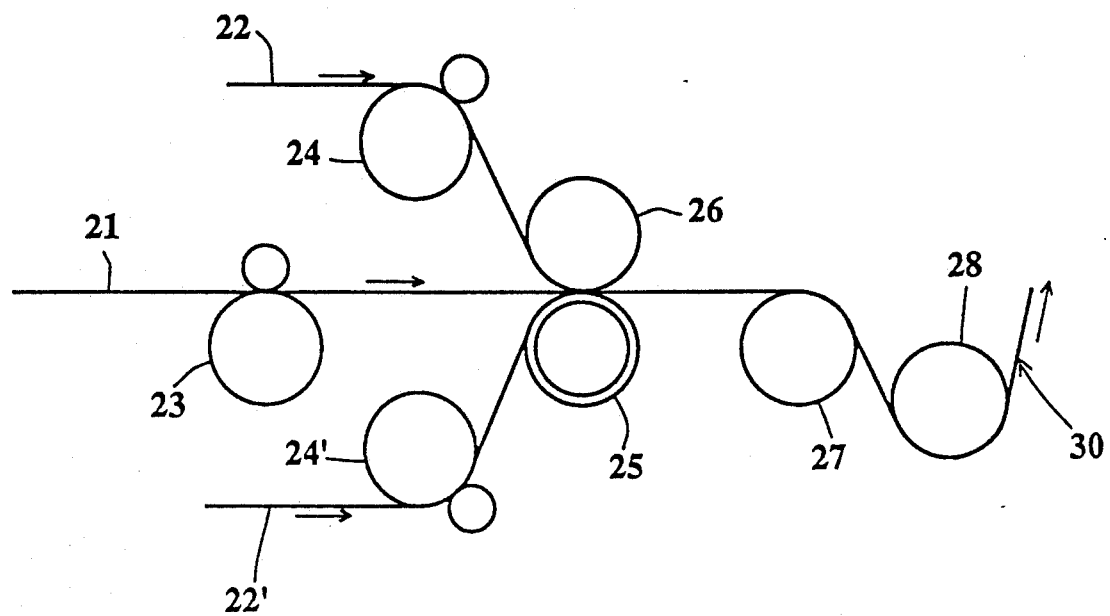
FIG. 2 is a schematic view showing an apparatus for carrying out the method of producing a composite film according to one embodiment of the present invention.

FIG. 2 illustrates a typical apparatus suitable for carrying out the adhesion of the elastomer film to the mesh-like sheet by hot pressing according to one embodiment of the present invention. The hot pressing apparatus comprises a roll 23 for cooling the elastomer film 21 for heat setting, guide rolls (preheat rolls) 24, 24' for guiding the mesh-like sheets 22, 22', a heating metal roll 25, a pressure roll 26 made of a silicone rubber for preventing the sticking of the elastomer film 21, and cooling rolls 27, 28. The gap between the heating metal roll 25 and the pressure roll 26 can be suitably adjusted to impart desired adhesion pressure to a composite film being formed.

In the present embodiment, one elastomer film 21 is bonded to both surfaces of the mesh-like sheets 22, 22' by hot pressing. Where the composite film is desired to have one mesh-like sheet, either one of the mesh-like sheet 22', or 22' should be omitted. On the other hand, where the composite film is desired to have one mesh-like sheet interposed between two elastomer films, it suffices to simply exchange the positions of the elastomer film 21 and the mesh-like sheets 22, 22'.

Figure 3:
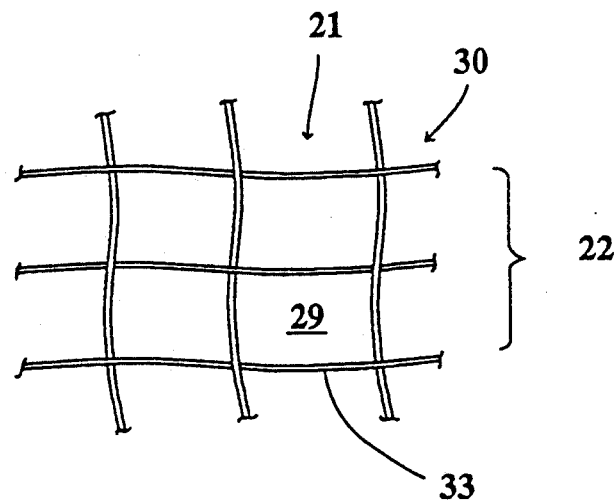
FIG. 3 is an enlarged view showing a hot-pressed composite film.

FIG. 3 shows the details of the gas-permeable composite film 30 obtained by hot-pressing the elastomer film 21 to the mesh-like sheet 22. Since the elastomer film 21 is adhered to the fibers 33 of the mesh-like sheet 22, an elastomer film portion 29 existing in a space between the adjacent fibers 33 is in a state of being fixed by the surrounding fibers 33. Here, when the elastomer film portion 29 is subjected to heat shrinkage, the elastomer film portion 29 is pulled by the surrounding fibers 33 because the positions of the surrounding fibers 33 are not substantially changed.

Figure 4:
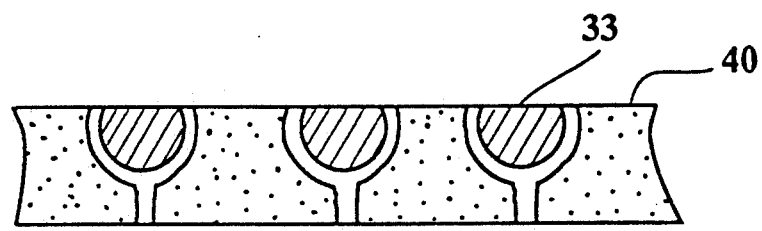
FIG. 4 is an enlarged cross-sectional view showing fibers embedded in the elastomer film in one embodiment of the present invention.

FIG. 4 is an enlarged cross-sectional view showing one example of the adhesion state of an elastomer film 40 and fibers 33 of the mesh-like sheet. Since the fibers 33 are embedded in the elastomer film 40, they microscopically serve as fixed frameworks for the elastomer film 40 in the heat shrinkage of the elastomer film 40. Thus, fine gaps (micropores) are generated between the fibers 33 and the elastomer film 40.

Figure 5:
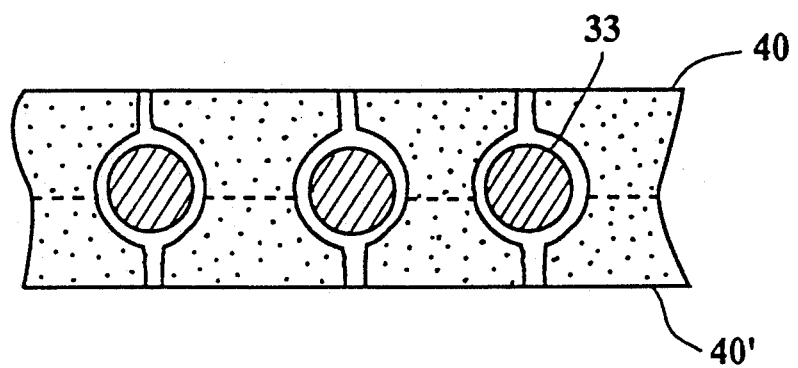
FIG. 5 is an enlarged cross-sectional view showing fibers embedded in the elastomer film in another embodiment of the present invention.

FIG. 5 is an enlarged cross-sectional view showing one example of a composite film produced by hot pressing of two elastomer films 40, 40' to a mesh-like sheet. Similarly in FIG. 4, the fibers 33 microscopically serve as fixed frameworks for films 40, 40' at the time of the heat shrinkage of the films 40, 40', causing fine gaps (micropores) between the fibers 33 and the films 40, 40'.

As described above, the composite film obtained according to the method of the present invention has micropores by heat shrinkage, and the film layer of the composite film has high heat resistance because it is cross-linked by thermal energy or electron beam irradiation. Accordingly, it is relatively difficult to bond the cross-linked films by thermal fusion. Thus, the following bonding techniques are preferably utilized:

(1) By high-frequency fusion, the composite film is bonded in a finished product shape such as a glove, and then subjected to a cross-linking treatment.

(2) An uncross-linked film such as an unoriented film is interposed between the composite films and then bonded together.

(3) Bonding is conducted after preliminary heating high-frequency electrodes. The composite film cross-linked by irradiation of 5-20 Mrad can be completely bonded at an annular die temperature of 130° C. or higher.

The thermoplastic elastomer composition comprising the ethylene-propylene-diene copolymer and the ethylene-vinyl acetate copolymer has a good stretchability in a relatively low temperature range of 40°-60° C. To conduct orientation of the elastomer film by an air-cooled inflation method in a low temperature range of 40°-60° C., a neck portion is first formed in such a temperature range that an elastomer film shows a melt tension, enabling the production of a stable thin film stably, and then it is cooled and solidified while being oriented biaxially from the neck portion toward the frost line. Thus, a thin, uniform bubble can be formed stably.

Incidentally, double bonds contained in main chains of the elastomer serve as cross-linking points which reduce the sliding of the molecular chains, thereby generating rubber elasticity. However, the double bonds are vulnerable to oxidation. When the double bonds are oxidized, molecular chains are cut, generating new cross-linking points. When the elastomer molecular chains are cut, the elastomer film becomes sticky, and when the elastomer molecular chains are largely cross-linked, the elastomer film becomes brittle. In any case, the rubber elasticity will be lost. Accordingly, a proper heat treatment should be conducted to achieve a proper cross-linking.

The present invention will be explained in further by means of the following Examples and Comparative Examples.

EXAMPLE 1. COMPARATIVE EXAMPLES 1 AND 2

Figure 6:
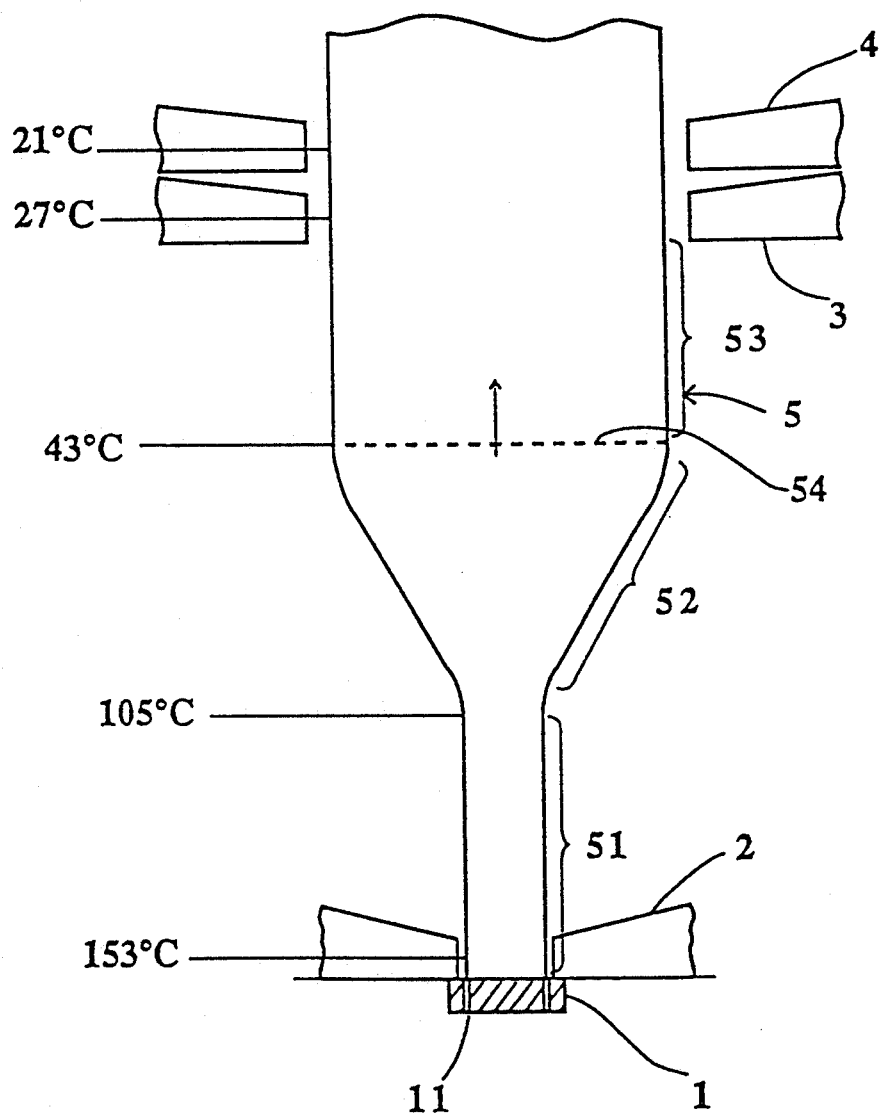
FIG. 6 is a schematic view showing film-forming conditions in Example 1.

A composition consisting of 60 weight % of an ethylene-propylene-diene copolymer (Vistalon 3708 produced by Exxon Chemical Japan, Ltd.) and 40 weight % of an ethylene-vinyl acetate copolymer (vinyl acetate content: 28 weight %, melt index: 20 g/10 minutes) was melted and kneaded in a double-screw extruder. The resulting blend was formed into an elastomer film by an air-cooled inflation method (Example 1, Comparative Example 1) and by a water-cooled inflation method (Comparative Example 2). The film-forming conditions and the properties of the resulting elastomer film are shown in Table 3. The film forming conditions in Example 1 are also shown in FIG. 6. Incidentally, the resulting elastomer films were not subjected to annealing.

The bubble stability was evaluated by the naked eyes and classified as follows:

⊙: Extremely stable.

○: Stable.
△: Unstable.

TABLE 3

| Film-Forming Conditions | Example 1 | Comparative Example 1 | Comparative Example 2 |
|---|---|---|---|
| Inflation Method | A C[1] | A C[1] | W C[2] |
| Bubble Type[3] (Neck length/die diameter) | H (1.8) | L (0) | L (0) |
| Cylinder Temperature of Extruder (°C.) | 150 | 150 | 150 |
| Resin Temperature at Die Exit (°C.) | 155 | 155 | 165 |
| Resin Pressure at Die Exit (kg/cm²) | 380 | 380 | 280 |
| Blow-Up Ratio | 3.8 | 3.8 | 1.6 |
| Take-Up Speed (m/minute) | 33.4 | 11.1 | 6.0 |
| Film Thickness (μm) | 12 | 20 | 100 |
| Yield Strength[4] (kg/cm²) MD | 51 | 45 | 26 |
| Yield Strength[4] (kg/cm²) TD | 20 | 17 | 20 |
| Breaking Strength[5] (kg/cm²) MD | 365 | 190 | 197 |
| Breaking Strength[5] (kg/cm²) TD | 260 | 120 | 125 |
| Elongation at Break[6] (%) MD | 300 | 430 | 621 |
| Elongation at Break[6] (%) TD | 350 | 580 | 715 |
| 1% Modulus[7] (kg/cm²) MD | 156 | 140 | 106 |
| 1% Modulus[7] (kg/cm²) TD | 130 | 145 | 113 |
| Tear Strength[8] (g) MD | 14.3 | 29 | 13 |
| Tear Strength[8] (g) TD | 20.5 | 62 | 29 |
| Heat Shrinkage Ratio (at 50° C. 7 days) MD | 25 | 20 | 5 |
| Heat Shrinkage Ratio (at 50° C. 7 days) TD | 20 | 5 | 3 |
| Strain (%) after Repeated 50%- Elongation[9] MD | 5.0 | 5.0 | 4.0 |
| Strain (%) after Repeated 50%- Elongation[9] TD | 5.0 | 3.0 | 2.0 |
| Unevenness in Thickness R[10] (μm) | 3 | 4 | 30 |
| Bubble Stability | ○ | ○ | ○ |

Note
[1] Air-cooled.
[2] Water cooled. Direction of drawing: downward. Cooling water temp.: 30° C. Temp. near a fros line: 25° C.
[3] L: No neck. H: Long neck (High-neck type).
[4] Measured according to ASTM-D882.
[5] Measured according to ASTM-D882.
[6] Measured according to ASTM-D882.
[7] Measured according to ASTM-D882.
[8] Measured according to ASTM-D1922.
[9] Measured according to JIS L1096.
[10] Measured according to JIS Z8105.
Measured with a dial gauge.
R = Maximum thickness - minimum thickness.

As is clear from Table 3, the air-cooled inflation method in Example 1 produced a thin elastomer film (12 μm) stably at a high take-up speed of 33.4 m/minute. On the other hand, the take-up speed in Comparative Example 1 was as low as 11.1 m/minute. Further, in Comparative Example 2, the resulting elastomer film was as thick as 100 μm. This means that the elastomer film cannot be produced stably at as high a speed as in Example 1 when the inflation methods in Comparative Examples 1 and 2 are used.

EXAMPLES 2-11

100 parts by weight of a composition consisting of 60 weight % of an ethylene-propylene-diene copolymer (Vistalon 3708 produced by Exxon Chemical Japan, Ltd.) and 40 weight % of an ethylene-vinyl acetate copolymer (vinyl acetate content: 28 weight %, melt index: 20 g/10 minutes) was mixed with one of low-density polyethylene (LDPE, density: 0.923 g/cm³, MI: 6.0 g/10 minutes), high-density polyethylene (HDPE, density: 0.940 g/cm³, MI: 0.1 g/10 minutes), linear low-density polyethylene (LLDPE, density: 0.935 g/cm³, MI: 2.8 g/10 minutes) and calcium carbonate (CaCO₃, Ryton A manufactured by Shiraishi Calcium K. K.) in a proportion shown in Table 4 and melt-blended in a double-screw extruder. Each of the resulting compositions was formed into an elastomer film by the same air-cooled inflation method as in Example 1, and each of the resulting elastomer films was annealed at 50°-60° C.

The compositions and the film-forming conditions of the elastomer films are shown in Table 4, and the mechanical properties of the elastomer films are shown in Table 5.

Incidentally, the anti-blocking property in Examples 2-11 was evaluated by measuring store time of each wound elastomer film of 5000 m in a Gear oven, after which the film could be unwound completely with a film width reduction of 20% or less.

△: Store time = less than 72 hours.
○: Store time = 72 hours or longer and less than 168 hours
◎: Store time = 168 hours or longer.

The evaluation of a heat shrinkage ratio was conducted after annealing.

TABLE 4

| | Example No. | | | | |
|---|---|---|---|---|---|
| | 2 | 3 | 4 | 5 | 6 |
| Composition* | | | | | |
| LDPE | — | 8 | 10 | 12 | — |
| HDPE | — | — | — | — | 8 |
| LLDPE | — | — | — | — | — |
| Filler (CaCO₃) | — | — | — | — | — |
| Film-Forming Conditions | | | | | |
| Bubble Type (Neck length/die diameter) | H (2.0) | H (2.0) | H (2.0) | H (2.0) | H (2.0) |
| Cylinder Temp. of Extruder (°C.) | 150 | 150 | 150 | 150 | 150 |
| Resin Temp. at Die Exit (°C.) | 155 | 155 | 155 | 155 | 155 |
| Resin Pressure at Die Exit (°C.) | 340 | 350 | 350 | 360 | 360 |
| Blow-Up Ratio | 5.0 | 5.0 | 5.0 | 5.0 | 5.0 |
| Take-Up Ratio (m/minuted) | 25 | 25 | 25 | 25 | 25 |

| | Example | | | | |
|---|---|---|---|---|---|
| | 7 | 8 | 9 | 10 | 11 |
| Composition* | | | | | |
| LDPE | — | — | — | — | — |
| HDPE | 10 | 12 | — | — | — |
| LLDPE | — | — | 10 | 12 | — |
| Filler (CaCO₃) | — | — | — | — | 10 |
| Film-Forming Conditions | | | | | |
| Bubble Type (Neck length/die diameter) | H (2.0) | H (2.0) | H (2.0) | H (2.0) | H (2.0) |
| Cyclinder Temp. of Extruder (°C.) | 150 | 150 | 150 | 150 | 150 |
| Resin Temp. at Die Exit (°C.) | 155 | 155 | 155 | 155 | 155 |
| Resin Pressure at Die Exit (°C.) | 370 | 380 | 355 | 370 | 380 |
| Blow-Up Ratio | 5.0 | 5.0 | 5.0 | | |
| Take-Up Speed (m/minuted) | 25 | 25 | 25 | 25 | 25 |

Note *Amount per 100 parts by weight of EPDM + EVA (unit: parts by weight).

TABLE 5

| Properties of Film | | | 2 | 3 | 4 | 5 | 6 | 7 | 8 | 9 | 10 | 11 |
|---|---|---|---|---|---|---|---|---|---|---|---|---|
| Film Thickness (μm) | | | 23 | 23 | 24 | 22 | 23 | 24 | 23 | 24 | 22 | 22 |
| Breaking Strength[1] | | | | | | | | | | | | |
| MD | (g/25 mm) | | 900 | 1000 | 1010 | 1067 | 1000 | 1100 | 1150 | 1000 | 1100 | 800 |
| | (kg/cm²) | | 180 | 200 | 202 | 215 | 200 | 220 | 230 | 200 | 220 | 160 |
| TD | (g/25 mm) | | 800 | 800 | 790 | 855 | 850 | 800 | 700 | 850 | 820 | 680 |
| | (kg/cm²) | | 160 | 160 | 158 | 177 | 170 | 160 | 140 | 170 | 164 | 136 |
| Elongation at Break[2] (%) | | MD | 700 | 700 | 700 | 620 | 700 | 650 | 690 | 700 | 720 | 610 |
| | | TD | 750 | 770 | 750 | 650 | 800 | 770 | 730 | 820 | 880 | 710 |
| Tear Strength[3] (g) | | MD | 110 | 120 | 125 | 140 | 125 | 145 | 155 | 130 | 140 | 115 |
| | | TD | 98 | 110 | 110 | 120 | 110 | 140 | 140 | 150 | 155 | 110 |
| Heat Shrinkage Ratio (%) (at 50° C., 7 days) | | MD | 7.0 | 6.0 | 5.0 | 5.0 | 6.0 | 5.0 | 5.0 | 5.0 | 5.0 | 6.4 |
| | | TD | 3.7 | 3.0 | 3.0 | 2.0 | 2.7 | 2.7 | 2.3 | 2.5 | 2.5 | 5.6 |
| Strain (%) after Repeated 50%-Elongation[4] | | MD | 5.0 | 5.5 | 6.0 | 6.5 | 7.5 | 7.5 | 8.0 | 7.5 | 8.1 | 6.4 |
| | | TD | 4.0 | 4.0 | 4.0 | 3.0 | 7.0 | 7.7 | 7.9 | 7.7 | 8.0 | 5.9 |
| Unevenness in Thickness R[5] (μm) | | | 5 | 3 | 3 | 3 | 3 | 3 | 2 | 5 | 5 | 4 |
| Bubble Stability | | | ○ | ⊙ | ⊙ | ⊙ | ○ | ⊙ | ⊙ | ○ | ○ | ⊙ |
| Anti-Blocking | 25° C. | | ⊙ | ⊙ | ⊙ | ⊙ | ⊙ | ⊙ | ⊙ | ⊙ | ⊙ | ⊙ |
| | 40° C. | | Δ | Δ | ○ | ⊙ | ○ | ⊙ | ⊙ | ○ | ○ | ○ |

Note
[1]Measured according to JIS L1096.
[2]Measured according to JIS L1096.
[3]Measured according to JIS K6772.
[4]Measured according to JIS L1096.
[5]Measured according to JIS Z8105.

EXAMPLE 12

The elastomer film obtained in Example 1 and a plain weave fabric made of a mixture of polyester fibers and nylon fibers (basis weight: 18 g/m², manufactured by Toyobo Co., Ltd.) were fed at a rate of 5 m/minute to an apparatus as illustrated in FIG. 2, and subjected to hot pressing at a temperature of 110° C. from the fabric side under pressure of 5 kg/cm².

Next, the resulting composite film was heated at 80° C. for 30 sec and then cooled to 30° C. It was reheated at 100° C. for 30 sec and then cooled to 30° C. It was again reheated at 120° C. for 30 sec and then cooled to 30° C.

The composite film thus heat-treated was measured with respect to thickness, basis weight, air permeability and heat resistance. The results are shown in Table 6.

EXAMPLE 13

Example 12 was repeated except for using a cotton fabric (33 g/m²) as a fabric and conducting, after hot pressing, the following heating-cooling steps:

| First step: | heating at 80° C. for 60 sec and cooling to 30° C.; |
|---|---|
| Second step: | heating at 120° C. for 60 sec and cooling to 30° C.; |
| Third step: | heating at 160° C. for 60 sec and cooling to 30° C.; |
| Fourth step: | heating at 200° C. for 60 sec and cooling to 30° C.; |

The composite film produced under the above conditions was subjected to the same measurements as in Example 12. The results are shown in Table 6.

EXAMPLE 14

Example 13 was repeated except for using a gauze (30 g/m²) instead of a cotton fabric, and the same measurements were carried out as in Example 12. The results are shown in Table 6.

EXAMPLE 15

The elastomer film obtained in Example 1 was sandwiched by the cotton fabric used in Example 13 and a polyester fabric and hot-pressed under the same conditions as in Example 12.

Next, the heating-cooling steps were conducted under the same conditions as in Example 13 to cross-link the elastomer film. The resulting composite film was measured with respect to thickness, basis weight, air permeability and heat resistance. The results are shown in Table 6.

EXAMPLE 16

The composite film hot-pressed in Example 12 was subjected to heat treatment at 80° C. for 60 sec and then irradiated with electron beam of 10 Mrad to produce a heat-resistant, air-permeable composite film. The same tests were conducted as in Example 12, and the results are shown in Table 6. Incidentally, in the irradiation step of electron beam, the generation of unacceptable odor was not observed.

TABLE 6

| Example No. | Type of Mesh-Like Sheet | Basis Weight (g/m²) | Air[1] Permeability (sec) | Heat Resistance[2] | | | Ignition Temp. |
|---|---|---|---|---|---|---|---|
| | | | | 150° C. | 200° C. | 250° C. | |
| 12 | Fabric of mixed fibers[3] | 230 | 150 | ○ | Δ | X | 200° C. |

TABLE 6-continued

| Example No. | Type of Mesh-Like Sheet | Basis Weight (g/m²) | Air[1] Permeability (sec) | Heat Resistance[2] 150° C. | 200° C. | 250° C. | Ignition Temp. |
|---|---|---|---|---|---|---|---|
| 13 | 100% Cotton fabric | 120 | 40 | ○ | ○ | △ | 265° C. |
| 14 | Gauze | 150 | 30 | ○ | ○ | △ | 350° C. |
| 15 | Cotton fabric and polyester fabric[4] | 260 | 300 | ○ | ○ | △ | 265° C. |
| 16 | Fabric of mixed fibers[3] | 200 | 60 | ○ | △ | X | 200° C. |

Note
[1]Expressed by the time (sec) necessary for 100 cc of the air to pass through a circular area (645.16 mm²) of a composite film sample.
[2]Evaluated by observing what change took place in 60 sec on a composite film sample placed 2.0 cm apart from a heater at each temperature with its film side toward the heater.
○ No change.
△ Discolored (fabric portion scorched).
X Burned (fabric portion burned).
[3]Polyester fibers + nylon fibers.
[4]Sandwich structure of cotton fabric/elastomer film/polyester fabric.

As described above in detail, since the elastomer film of the present invention is produced by an air-cooled inflation method, a sufficient orientation not only in an MD direction but also in a TD direction is achieved, and it shows almost uniform heat shrinkage biaxially.

The elastomer film of the present invention produced by an air-cooled inflation method has also a uniform thickness because each portion of the bubble (a portion just above an annular die exit, a neck portion, a transition portion, and a frost line) is controlled at an optimum temperature.

Since the elastomer film of the present invention produced by such an air-cooled inflation method is biaxially oriented, it can be combined with a mesh-like sheet without a stretching step and heat-shrinked to provide a microporous composite film.

Such a composite film shows excellent waterproofness and gas permeability, and utilizing these properties, various clothings, particularly disposable raincoats, gloves, sheets, diapers, etc. can be produced therefrom. Also, they are used for wrappings of deodorants, odorants, etc.

Since the annealed elastomer film shows a reduced heat shrinkage, they can be used for applications such as clothings in which little heat shrinkage is desired.

What is claimed is:

1. An elastomer film produced from a thermoplastic elastomer composition comprising 50-60 weight % of an ethylene-propylene-diene copolymer and 50-40 weight % of an ethylene-vinyl acetate copolymer having a vinyl acetate content of 5-30 weight % and a melt index of 0.2-25 g/10 minutes by an air-cooled inflation method wherein said thermoplastic elastomer composition is extruded from an annular die at a temperature of 170° C. or lower, a bubble of said elastomer composition is taken up such that said bubble comprises a neck portion having a diameter 1.0-4.0 times as long as the diameter of said annular die, and said neck portion is cooled to a temperature of 120° C. or lower, said elastomer film having a thickness of 10-60 μm, a draw ratio expressed by a heat shrinkage ratio at 50° C. which is 5-35% in an MD direction and 5-25% in a TD direction, the ratio of said heat shrinkage ratio in an MD direction to said heat shrinkage ratio in a TD direction being 3 or less, and a strain within 10% after repeated 50% elongation.

2. The elastomer film according to claim 1, wherein said elastomer film is annealed at 50°-60° C., and has a draw ratio expressed by a heat shrinkage ratio at 50° C. which is 10-2% in an MD direction and 10-2% in a TD direction.

3. The elastomer film according to claim 1, wherein said thermoplastic elastomer composition contains a polyolefin in an amount of 1-30 parts by weight per 100 parts by weight of said thermoplastic elastomer composition.

4. The elastomer film according to claim 1, wherein said thermoplastic elastomer composition contains a polyolefin in an amount of 1-30 parts by weight per 100 parts by weight of said thermoplastic elastomer composition.

5. The elastomer film according to claim 1, wherein said thermoplastic elastomer composition contains an inorganic filler in an amount of 2-15 parts by weight per 100 parts by weight of said thermoplastic elastomer composition.

6. The elastomer film according to claim 1, wherein said thermoplastic elastomer composition contains an inorganic filler in an amount of 2-15 parts by weight per 100 parts by weight of said thermoplastic elastomer composition.

* * * * *